UNITED STATES PATENT OFFICE.

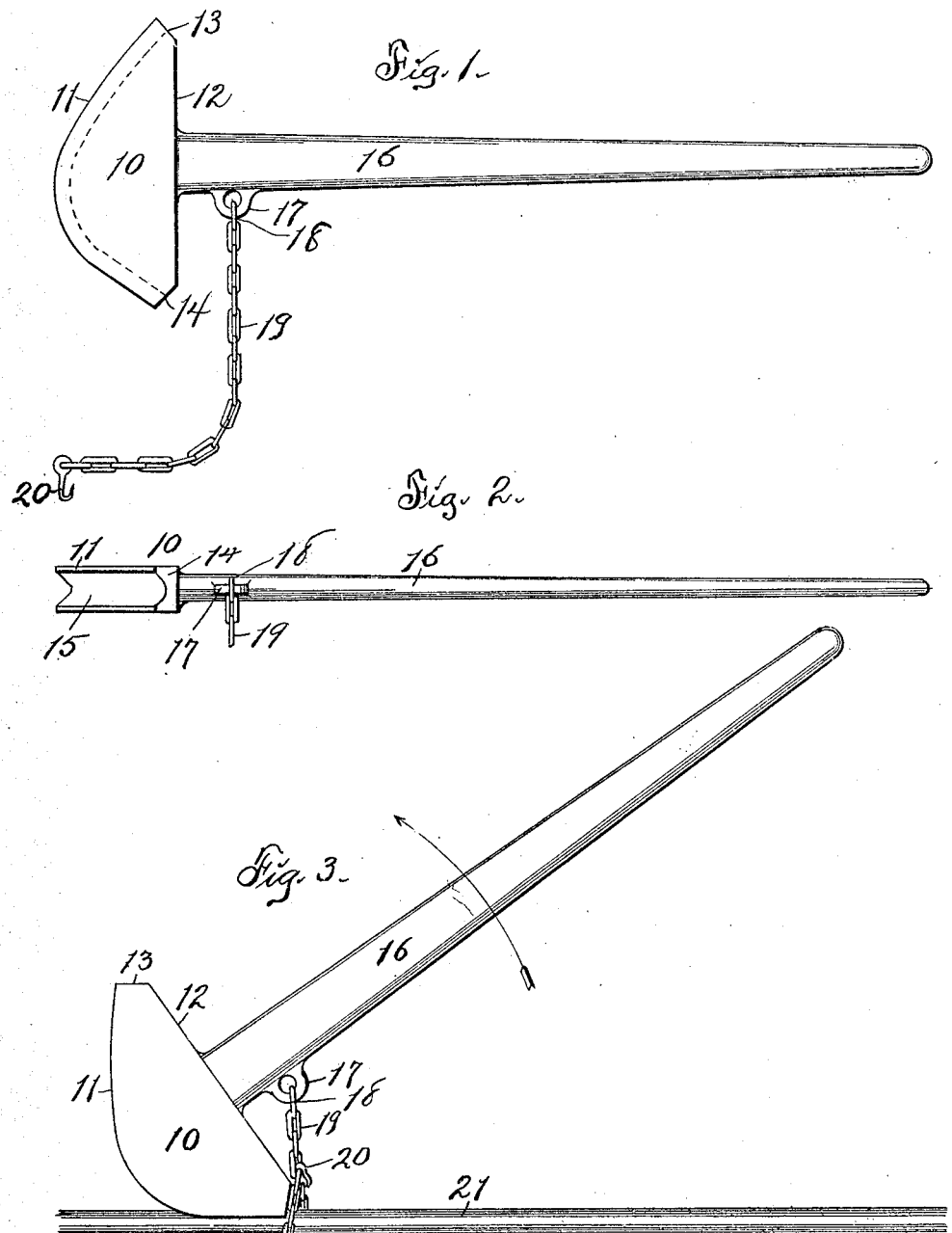

FRED A. WALLACE, OF DES MOINES, IOWA, ASSIGNOR OF ONE-HALF TO E. O. WALLACE, OF DES MOINES, IOWA.

PIPE-BENDING TOOL.

No. 871,052.　　　　Specification of Letters Patent.　　　　Patented Nov. 12, 1907.

Application filed January 21, 1907. Serial No. 353,726.

*To all whom it may concern:*

Be it known that I, FRED A. WALLACE, a citizen of the United States of America, and resident of Des Moines, Polk county, Iowa, have invented a new and useful Pipe-Bending Tool, of which the following is a specification.

The object of this invention is to provide improved means for bending pipes or rods intermediate of their ends.

My invention consists in the construction, arrangement and combination of elements hereinafter set forth, pointed out in my claims and illustrated by the accompanying drawing, in which—

Figure 1 is a side view of the complete device. Fig. 2 is an edge view of the device, a portion of a chain broken away. Fig. 3 is a side view showing the device in position for practical use.

In the construction of the device as shown the numeral 10 designates a head relatively thin and broad and approximately semicircular in side view, having a curved margin 11, a plane margin 12 and inclined connecting margins 13, 14. A groove 15 is formed in and longitudinally of the curved margin of the head 10 and said groove is V-shaped in cross-section. A handle 16 is fixed to and extends at right angles from the central portion of the plane margin 12 of the head 10, and an eye 17 is formed on or fixed to one side of said handle adjacent the head. A ring 18 is mounted in the eye 17 and a chain 19 is connected with said ring and terminates in a hook 20.

In practical use the tool is positioned on a pipe 21 and intermediate of the ends of said pipe, the groove 15 partially embracing the pipe and the handle 16 extending at an acute angle from the pipe. The chain 19 is passed around the pipe 21 and the hook 20 is engaged with the chain to form a loop embracing said pipe. Manual force is then applied to move the handle in the direction indicated by the arrow in Fig. 3, thus rocking the head 10 relative to the initial plane of the pipe and causing the chain to lift one end portion of the pipe and bend said pipe around the curved margin 11 of said head, the groove 15 preventing lateral movement of the pipe relative to the head. In like manner a rod or bar may be engaged and bent. The degree of curvature depends on the radius of the head and the extent of oscillation thereof by the handle 16.

I claim as my invention—

1. A pipe-bending tool, comprising a head formed with a longitudinally-curved and transversely V-shaped work-engaging surface, a handle fixed to said head diametrically of the work-engaging surface, the greatest dimension of said head being transversely of said handle, an eye formed on said handle adjacent the head, a chain pivoted at one end to said eye, and a hook on the opposite end of said chain.

2. A pipe-bending tool, comprising a head plane on one margin and curved on the margin opposite thereto, the curved margin of said head formed with a groove V-shaped in cross-section, a handle formed on said head and extending at right angles to the plane margin thereof, the greatest dimension of said head being transversely of said handle, an eye formed on said handle adjacent said head, a chain pivoted at one end to said eye, and a hook on the opposite end of said chain.

Signed by me at Des Moines, Iowa, this 18th day of May, 1906.

FRED A. WALLACE.

Witnesses:
　S. C. SWEET,
　L. L. LEIBROCK.